United States Patent
Blakley

(10) Patent No.: US 6,517,246 B2
(45) Date of Patent: Feb. 11, 2003

(54) FLEXIBLE SUPPORT AND METHOD FOR A STEADY BEARING

(75) Inventor: Robert A. Blakley, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 5 days.

(21) Appl. No.: 09/750,269

(22) Filed: Dec. 29, 2000

(65) Prior Publication Data

US 2002/0085776 A1 Jul. 4, 2002

(51) Int. Cl.[7] .............................................. F16C 23/04
(52) U.S. Cl. ........................................ 384/192; 384/215
(58) Field of Search ................................. 384/192, 193, 384/202, 215, 200

(56) References Cited

U.S. PATENT DOCUMENTS

| | | | | |
|---|---|---|---|---|
| 1,174,955 A | * | 3/1916 | Balzer | 384/199 |
| 1,337,987 A | * | 4/1920 | Anderson | 384/200 |
| 1,373,084 A | * | 3/1921 | Leitch | 384/200 |
| 1,647,386 A | | 11/1927 | Weis | |
| 1,737,321 A | * | 11/1929 | Minck | 384/200 |
| 2,187,600 A | * | 1/1940 | Degerth et al. | 384/200 |
| 2,919,888 A | | 1/1960 | Simmons | |
| 2,936,999 A | | 5/1960 | Coar et al. | |
| 3,149,888 A | | 9/1964 | Lennon | |
| 3,180,696 A | | 4/1965 | Buse | |
| 3,284,067 A | * | 11/1966 | Mattern | 384/193 |
| 3,371,970 A | * | 3/1968 | Beerli | 384/193 |
| 3,379,415 A | | 4/1968 | Logue | |
| 3,443,794 A | | 5/1969 | Peterson | |
| 3,489,469 A | | 1/1970 | Stratienko | |
| 4,025,131 A | | 5/1977 | Bergquist et al. | |
| 4,057,226 A | | 11/1977 | De Mos et al. | 366/244 |
| 4,240,550 A | | 12/1980 | Collin | |
| 4,240,683 A | * | 12/1980 | Crase | 308/227 |
| 4,466,511 A | * | 8/1984 | Garnett | 188/134 |
| 4,565,453 A | | 1/1986 | Jekat et al. | |
| 4,660,989 A | | 4/1987 | Davis | |
| 4,727,762 A | * | 3/1988 | Hayashi | 74/89.15 |
| 5,017,104 A | | 5/1991 | Baker et al. | |
| 5,026,175 A | | 6/1991 | Sato | |
| 5,037,212 A | * | 8/1991 | Justman et al. | 384/97 |
| 5,088,832 A | | 2/1992 | Gambrill et al. | |
| 5,568,975 A | | 10/1996 | Blakley et al. | |
| 5,618,107 A | | 4/1997 | Bartsch | |
| 5,758,966 A | | 6/1998 | Prillwitz | |
| 6,224,533 B1 | * | 5/2001 | Bengtsson et al. | 384/535 |

FOREIGN PATENT DOCUMENTS

| | | |
|---|---|---|
| FR | 1011067 | 6/1952 |
| FR | 2663089 | 12/1991 |
| GB | 819111 | 8/1959 |

* cited by examiner

*Primary Examiner*—Jack Lavinder
*Assistant Examiner*—Mariano Sy
(74) *Attorney, Agent, or Firm*—Baker & Hostetler LLP

(57) ABSTRACT

An improved flexible support for a steady bearing in rotational contact with the surface of a shaft allows the bearing and housing to substantially track the contact surface of an impeller shaft when the shaft is subject to elastic deflection during operation. The flexible support employs a flexible disc pack, which is comprised of a plurality of thin, flexible disc elements in a stacked arrangement. The disc pack is mounted to a support ring and is also mounted to the bearing housing such that the bearing housing and other bearing elements are capable of deflection to substantially align with the axis of the impeller shaft when the shaft deflects.

21 Claims, 7 Drawing Sheets

FLEXIBLE SUPPORT AND METHOD FOR A STEADY BEARING

FIELD OF THE INVENTION

The present invention relates generally to apparatus and methods for supporting steady bearings, which are used to support impeller shafts mounted in a variety of reactors, vessels and mixing apparatus. Steady bearings for shafts in such vessels are in wide use in the chemical, petroleum, pharmaceutical, cosmetic, food preparation and other industries. More particularly, the present invention relates to a flexibly supported steady bearing to support impeller shafts mounted in a variety of reactors, vessels and mixing apparatus.

BACKGROUND OF THE INVENTION

When in operation impeller shafts are subject to a number of forces that act to damage and possibly lead to failure of the impeller shaft. A mixer shaft driving an impeller in a vessel can undergo substantial dynamic bending distortion during mixing operation. This deflection can cause permanent damage or distortion and even complete failure of the impeller shaft during operation. It is also known that impeller shafts, especially longer shafts are prone to lateral displacement while in operation, due to the force of loads in the mixing vessel.

It is known to provide one or more intermediate steady bearings along an impeller shaft to control dynamic bending distortion of the shaft. In addition, such assemblies provide lateral stability to the impeller shaft during operation. Even when an intermediate steady bearing is used to support an impeller shaft as indicated above, the shaft can still be prone to deflection during operation. In rigid bearing designs it may not be possible for the bearing to track the angular changes in the contact surface of the impeller shaft when the shaft is subject elastic deflection during operation. This leads to hard contact of the impeller shaft at the two ends of the bearing assembly. Hard contact resulting from this deficiency in rigid bearing designs can lead to excessive and uneven wear of bearing components, e.g., in an hourglass pattern.

Accordingly, it is desirable to provide a flexible steady bearing support assembly that allows the bearing components to track the contact surface of the impeller shaft when the impeller is in operation.

SUMMARY OF THE INVENTION

It is therefore a feature and advantage of the present invention to provide an improved flexible support for a steady bearing in rotational contact with the surface of a shaft, which allows the bearing and housing to track the contact surface of an impeller shaft, even when the shaft is subject to significant elastic angular deflection during operation.

The above and other features and advantages are achieved through the use of a novel flexible support for a steady bearing using a flexible disc pack.

In accordance with a general embodiment of the present invention, at least one flexible disc pack is provided, which is comprised of a plurality of thin, flexible disc elements in a stacked arrangement. The radial dimensions of the individual disc elements and the thickness and number of disc elements can vary dependent on the dimensions of the shaft and bearing elements with which the invention is to be used.

Accordingly, in one aspect of the invention, therefore, several disc elements are assembled in a stacked arrangement to produce a "disc pack", which is incorporated into the new flexible bearing support design. In some embodiments, a disc pack is comprised of three individual disc elements, but may contain more based on the requirements of the bearing design. The disc pack can be mounted to a rigid support ring, which acts as a means for supporting the bearing on the impeller shaft when completely assembled. The support ring can be supported by an assembly of three or more struts.

In another aspect of the current invention, once the disc pack is securely mounted to the rigid support ring, the bearing housing and other bearing elements are mounted to the disc pack, such that the bearing housing and other bearing elements are capable of significant deflection around the vertical axis of the impeller shaft.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
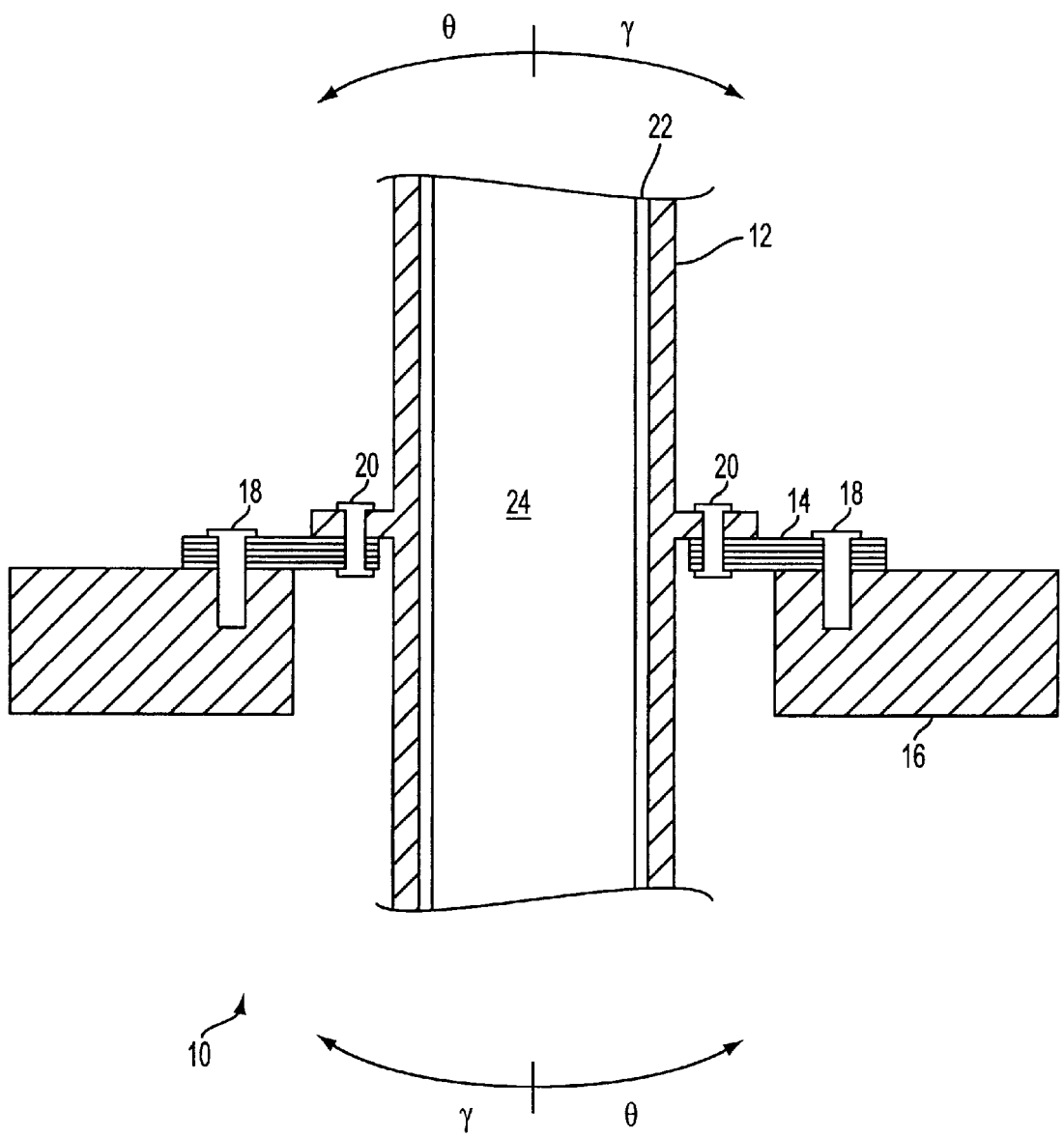
FIG. 1 illustrates a cross sectional view of an assembled flexible bearing assembly using a one piece bearing and a single disc pack.

The present invention is a flexible support for a steady bearing, which allows bearing components to substantially track angular changes in the contact surfaces of an impeller shaft when the shaft is subject to angular deflection during operation. The present invention accomplishes this significant improvement by providing at least one flexible disc pack, which is comprised of at least one or a plurality of thin, flexible disc elements in a stacked arrangement. The individual disc elements most preferably have a thickness of approximately 0.020" to 0.040" and are constructed of an alloy material that provides sufficient flexibility to the disc elements. However, it is also preferable to use discs with a thickness of 0.010" to 0.060". Other thicknesses may also be used. In one preferred embodiment, the individual disc elements have a thickness of approximately 0.020" and are constructed of titanium. The thickness and the radial dimensions of the individual disc elements can vary dependent on the dimensions of the shaft and bearing elements with which the invention is to be used.

A first embodiment 10 is shown used with a single piece bearing assembly 12 supported on a single disc pack 14 attached to a support ring 16. This embodiment is shown e.g., in FIG. 1 and is explained in greater detail below supporting a shaft 24.

A second embodiment 30 is shown used with a two piece bearing 32, 34, where an upper half 32 and a lower half 34 of a bearing assembly are joined by two disc packs 36, 38 to a common rigid support ring 40. This second design is sometimes preferred for application with longer bearing assemblies, typically greater than 20", though it is also suitable to use it with bearing assemblies of less than 20". This second embodiment of the invention shown e.g. in FIG. 2 includes separate upper and lower disc packs 36, 38 for the two separate bearing assembly halves 32, 34. However, in some circumstances a two piece bearing assembly can be supported using only a single disc pack.

Figure 4:
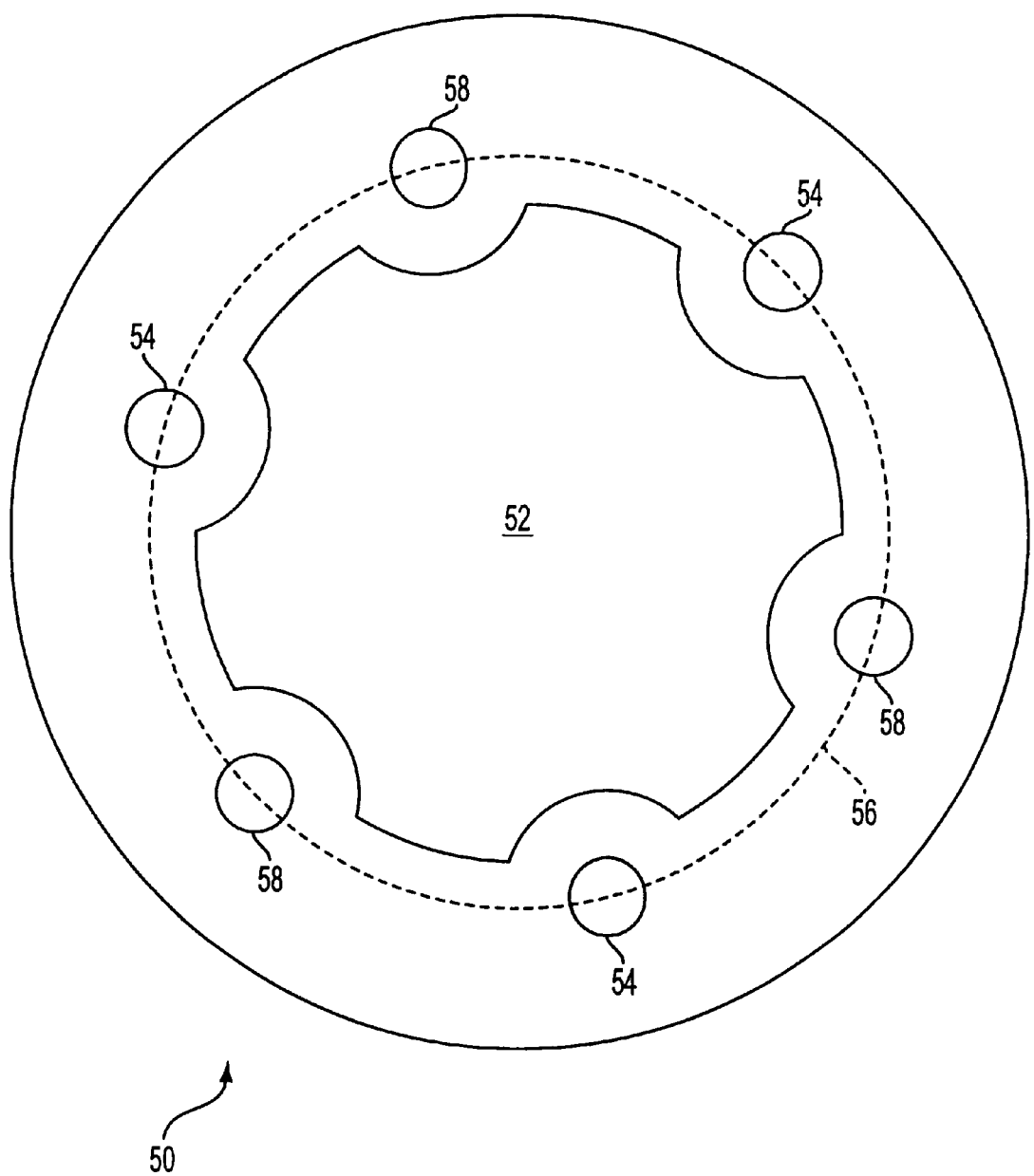
FIG. 4 illustrates a first contemplated embodiment of a disc element for use in a flexible bearing assembly.

Referring to FIG. 4, a plan view of the top of an individual disc element 50 is shown, the bottom view of which is substantially the same as the top view. A plurality of disc elements 50 are structured to form a disc pack 14, 36 or 38. Although a disc pack is shown as an example forming a plurality of individual stacked discs, it may be preferable to employ only a single disc, which would then constitute a disc pack. Such disc element 50 is a ring structure with a center section 52, through which an impeller shaft can pass. A first plurality of machined holes 54 are spaced at regular intervals around a circumference defined by a circle 56 around the disc element. The first plurality of holes 54 provide a means by which individual disc elements may be secured together in a disc pack. The first plurality of holes 54 further provide a means by which an assembled disc pack may be flexibly secured to support ring 16, 40. A second plurality of machined holes 58 are spaced at regular intervals around the same circle 56 of the disc element, such that each one of the second plurality of holes 58 is spaced equidistant between two of the holes 54. The second plurality of holes 58 provide a means by which individual disc elements may be secured together in a disc pack 14, 36 or 38. The second plurality of holes 58 further provide a means by which an assembled disc pack may be flexibly secured to a bearing housing 12, 32, 34.

Figure 5:
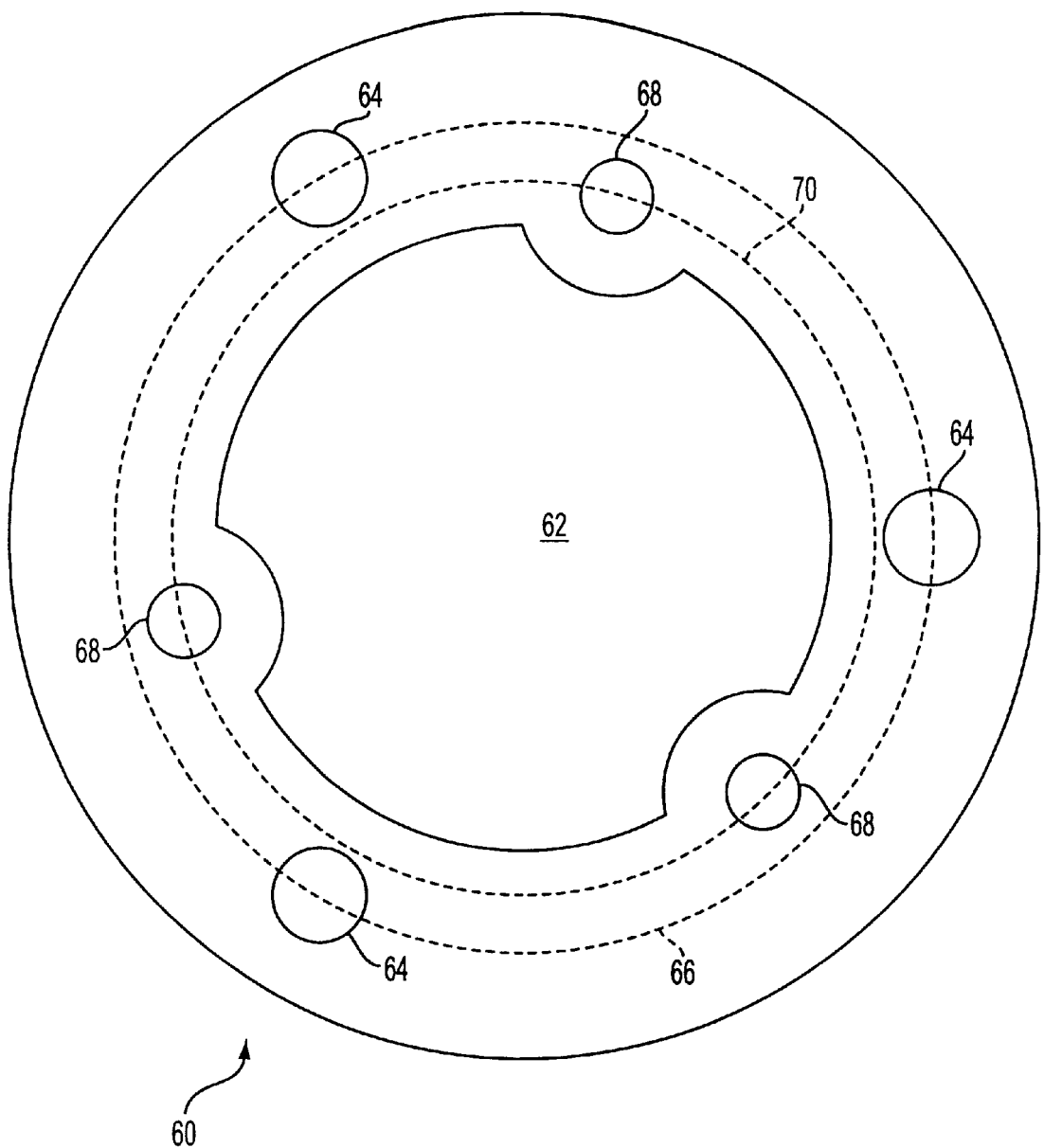
FIG. 5 illustrates a second contemplated embodiment of a disc element for use in a flexible bearing assembly.

Referring to FIG. 5, an embodiment of the disc element is illustrated in top view, the bottom view of which is substantially the same as the top view. The disc element 60 is a ring structure with a center section 62, through which an impeller shaft can pass. A first plurality of machined holes 64 are spaced at regular intervals around a first, outer, circle 66 circumscribing the disc element outside a second circle 70. The first plurality of holes 64 provide a means by which individual disc elements may be secured together in a disc pack 14, 36 or 38. The first plurality of holes 64 further provide a means by which an assembled disc pack may be flexibly secured to a rigid support ring 16, 40. A second plurality of machined holes 68 are spaced at regular intervals around a second, inner, circle 70, circumscribing the disc element. The second plurality of holes 68 provide a means by which individual disc elements may be secured together in a disc pack. The second plurality of holes 68 further provide a means by which an assembled disc pack may be flexibly secured to a bearing housing 12, 32, 34.

The disc pack 14, 36, 38 is mounted to the rigid support ring and the bearing housing by means of bolts, pins, screws or other appropriate fastening devices in what may be a flange type joint. The individual disc elements may be constructed of an alloy which imparts sufficient flexibility and corrosion resistance to the disc elements.

Referring to FIG. 1, a preferred embodiment of the present inventive apparatus and method is illustrated with a cross section of an assembled flexible steady support bearing using a single piece bearing 12. The flexible disc pack 14 is mounted to the rigid support ring 16 by fasteners 18 and to bearing housing 12 by means of fasteners 20. A bearing 22 resides within the bearing housing 12, through which the impeller shaft 24 is oriented along an axis of rotation. When the impeller shaft 24 is subject to elastic deflection, the flexible disc pack 14 flexes, allowing the bearing housing 12 and bearing 22 to track the contact surface of the impeller shaft 24. As noted in FIG. 1, in the single piece bearing embodiment, the upper and lower ends of the bearing deflect in an angle $\theta$ or $\gamma$.

Figure 3:
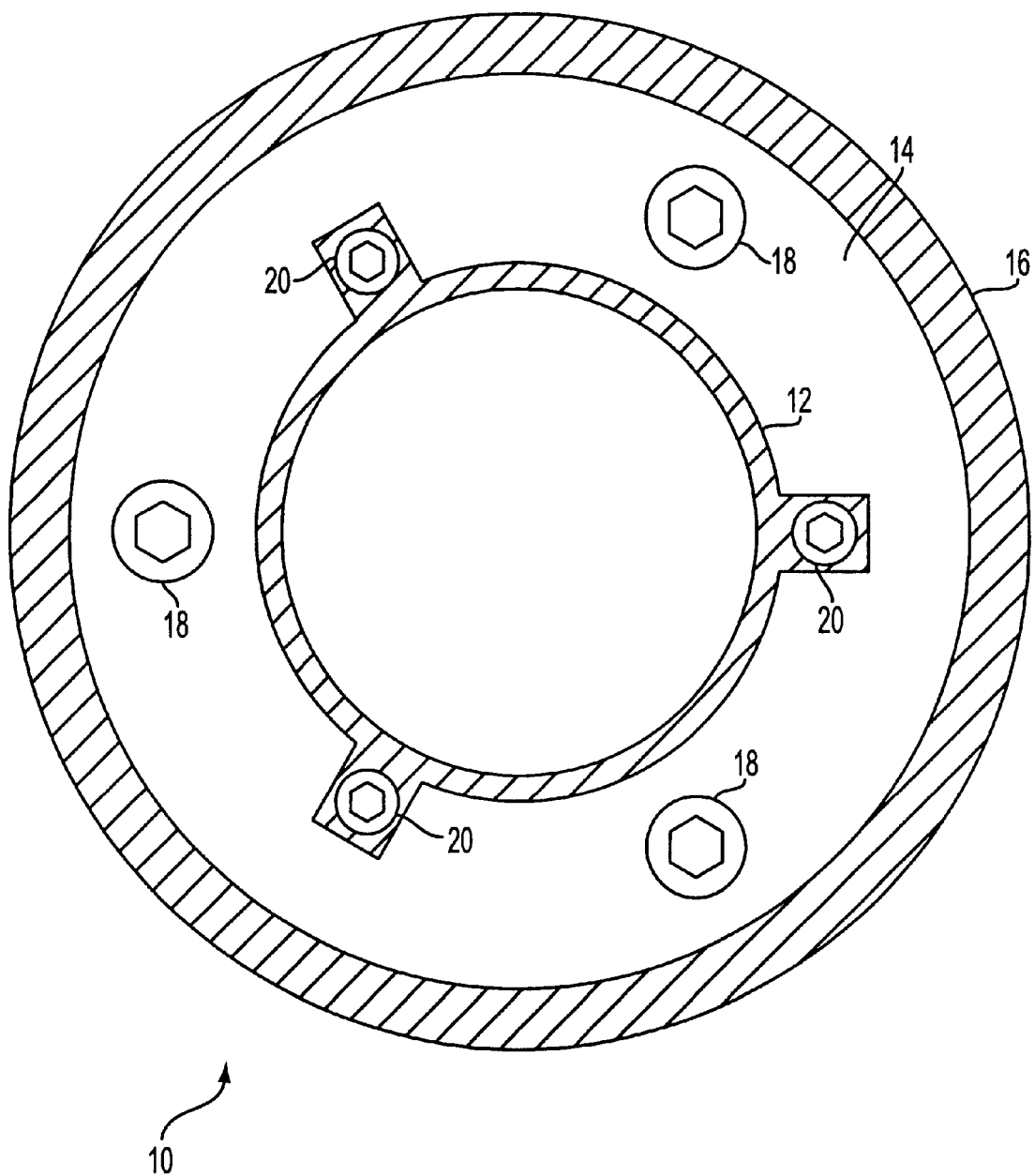
FIG. 3 illustrates a plan overhead view of an assembled flexible bearing assembly of the current invention.

Referring now to FIG. 3, the assembled flexible steady support bearing assembly 10 of FIG. 1 is shown in plan view. The disc pack 14 is flexibly mounted to a support ring 16, by means of fasteners 18. The disc pack 14 is further flexibly mounted to the bearing housing 12, by means of fasteners 20. The mounting of the disc pack 14 to the support ring 16 and bearing housing 12 as illustrated allows the flexible disc pack 14 to flex. This in turn allows the bearing housing to deflect in response to elastic deflection of the impeller shaft 24 and thus track the contact surface of the shaft 24. FIG. 1 illustrates angles $\theta$ and $\gamma$ to which the shaft may deflect. These deflections can be accommodated by flexing of the disc pack so that the surface of the bearing stays substantially in parallel contact with the surface of the shaft. The disc pack also allows for this tracking to occur in any plane about the axis of the shaft, e.g. 360°.

Figure 2:
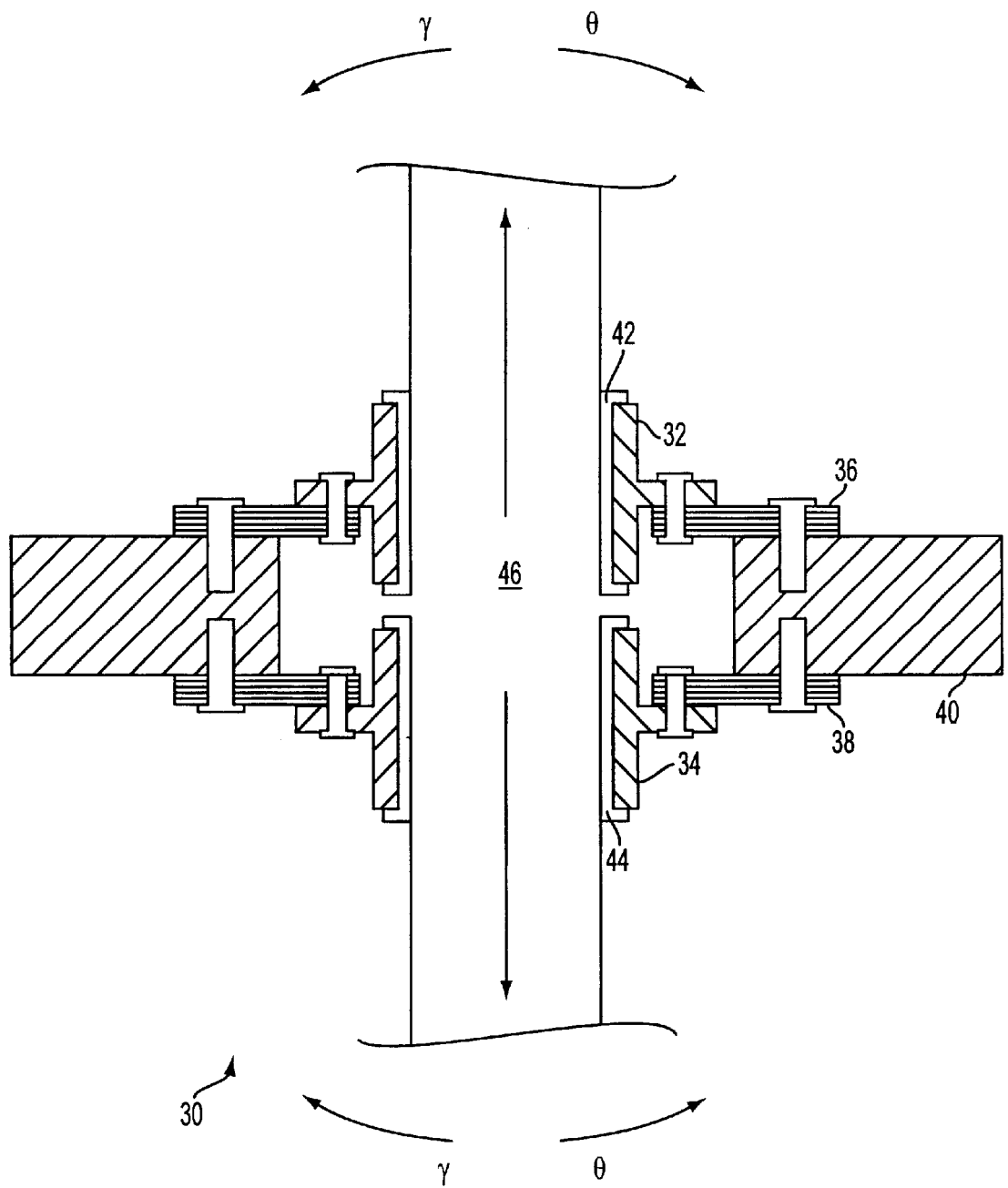
FIG. 2 illustrates a cross sectional view of an assembled flexible bearing assembly using a two piece bearing and two separate disc packs.

Another preferred embodiment of the present inventive apparatus and method is illustrated in FIG. 2, a cross section of an assembled flexible steady support bearing using a two piece bearing. An upper flexible disc pack 36 and lower flexible disc pack 38 are each independently flexibly mounted to opposite sides of a support ring 40. The upper flexible disc pack 36 is further flexibly mounted to an upper half 32 of a two piece bearing housing, wherein resides the upper half 42 of a two piece bearing through which the impeller shaft 46 is oriented along an axis of rotation. The lower flexible disc pack 38 is further flexibly mounted to a lower half 34 of a two piece bearing housing, wherein resides the lower half 44 of a two piece bearing through which the impeller shaft 46 is oriented along an axis of rotation. When the impeller shaft is subject to elastic deflection, each of the upper and lower flexible disc packs 36 and 38 can flex, allowing the each of the upper and lower bearing housings 32 and 34 and bearings 42 and 44 to track the impeller shaft contact surface. As noted in FIG. 2, in the two piece bearing embodiment, the upper and lower ends of the bearing can each deflect in an angle $\theta$ or $\gamma$ together or independently.

Figure 6:
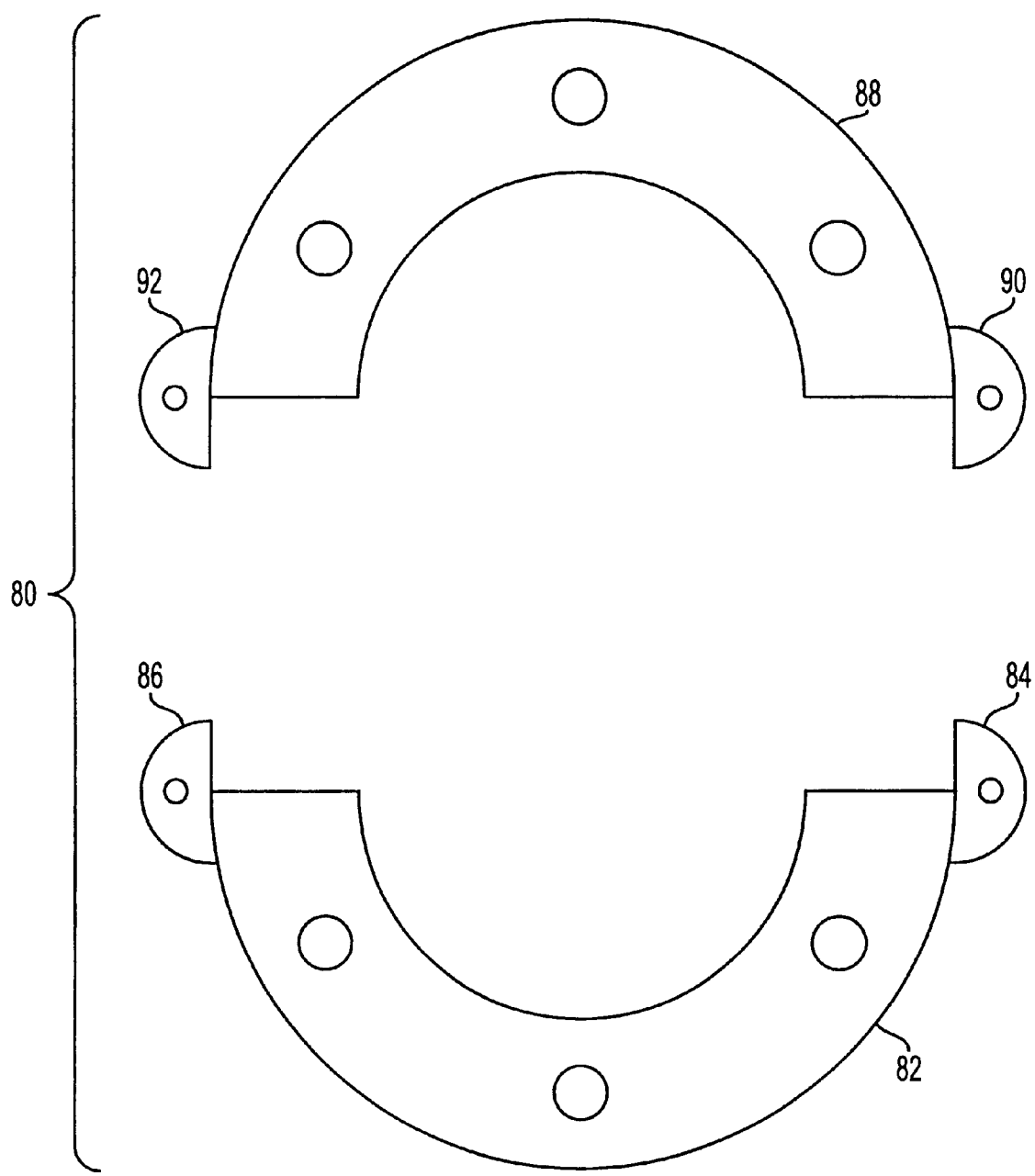
FIG. 6 illustrates a top view of a detachably connectable flexible disc element.

In an alternative preferred embodiment of either the single piece or two piece bearing embodiments, the rigid support ring, disc elements, bearing housing and other bearing elements are separable into substantially equivalent, detachably connectable halves, such that they may be removed from the impeller shaft without disturbing the shaft itself. Referring to FIG. 6, an embodiment of a separable disc element 80 of the current invention is shown. The first half 82 of the disc element 80 has attachment points 84 and 86 with holes provided through each. The second half 88 of the same disc element 80 has corresponding attachment points 90 and 92 with holes provided through each. The two halves 82 and 88 are detachably connectable to each other such that a common bolt, pin or other fastener passed through both of the holes of attachment points 86 and 92, detachably locks the two halves together. Similarly, a common bolt, pin or other fastener passed through both of the holes of attachment points 84 and 90 detachably locks the two halves together.

It will be noted by one skilled in the art that similar means may be used for detachably connecting separable halves of rigid support rings, bearing housings and other bearing elements. It will further be recognized by one skilled in the art that well known means other than the one demonstrated in FIG. 6 may be used to detachably connect two halves of the components of the current invention. Thus the present invention is not limited to the exact construction illustrated here.

Figure 7:
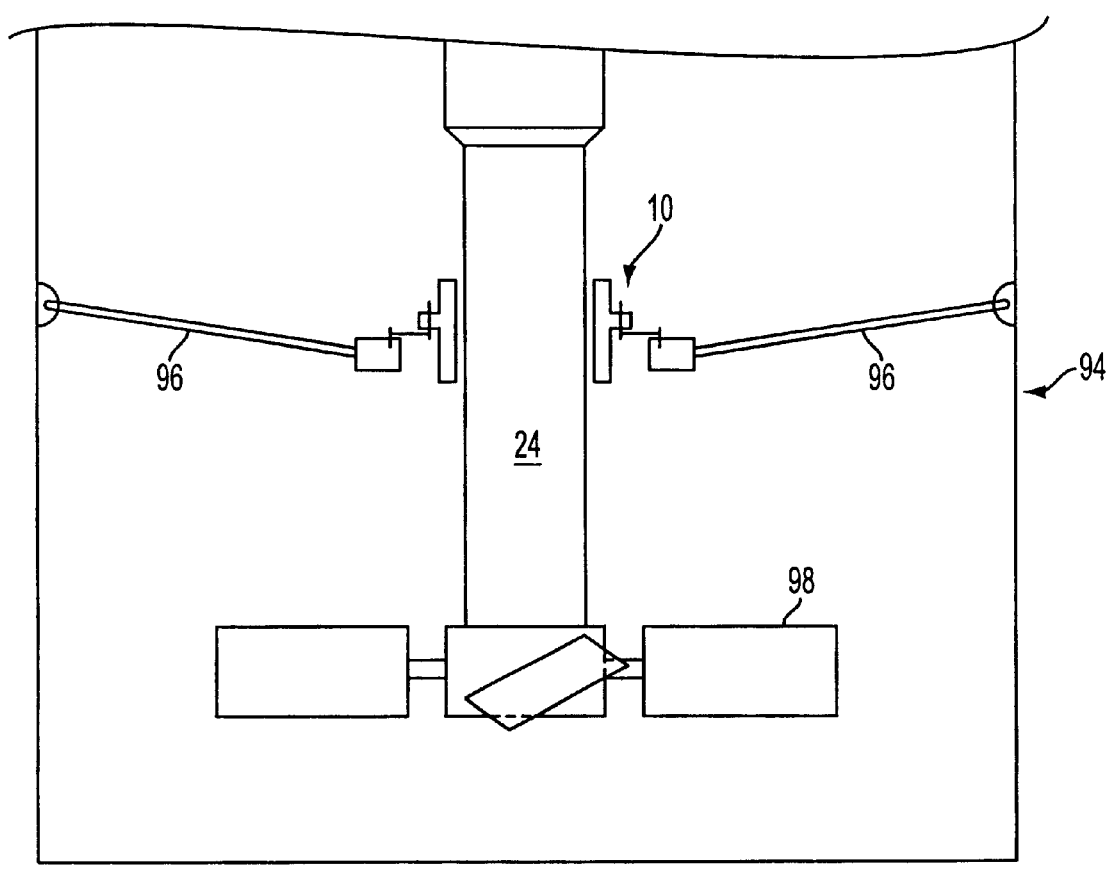
FIG. 7 illustrates a side cutaway view of a flexible bearing assembly installed in a mixing tank.

FIG. 7 illustrates a flexible bearing assembly 10 installed in a vessel 94 supported by struts 96, with impeller 98 mounted to the shaft 24.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A flexible support assembly for supporting a steady bearing in rotational contact with the surface of a shaft in a vessel, comprising:
    a bearing housing supporting the steady bearing;
    a support ring suspended from the vessel; and
    a flexible disc pack flexibly connecting said housing to said support ring.

2. An assembly according to claim 1, wherein said disc pack comprises a plurality of disc elements.

3. An assembly according to claim 2, wherein said disc elements have a thickness of 0.010" to 0.060".

4. An assembly according to claim 2, wherein said bearing housing, said support ring and said disc pack are each comprised of detachably connectable halves, adapted to be removed from the shaft without disturbing the shaft.

5. A flexible support assembly for supporting a steady bearing in rotational contact with the surface of a shaft in a vessel, comprising:
    a bearing housing supporting the steady bearing;
    a support ring suspended from the vessel; and
    a flexible disc pack connecting said housing to said support ring,
    wherein the shaft is rotatable about a longitudinal axis and said disc pack flexes to permit angular relative movement between a longitudinal axis of said bearing housing and a longitudinal axis of said support ring.

6. An assembly according to claim 5, wherein said disc pack flexes in response to a change in angular alignment of said shaft at said bearing so that an axis of said bearing housing maintains substantial parallelism with an axis of rotation of said shaft.

7. A flexible support assembly for supporting a steady bearing in rotational contact with the surface of a shaft in a vessel, comprising:
    a bearing housing supporting the steady bearing;
    a support ring suspended from the vessel; and
    a flexible disc pack flexibly connecting said housing to said support ring,
    wherein said disc pack comprises a first plurality of mounting holes at a first constant radial distance from the center of said disc pack and a second plurality of mounting holes at a second constant radial distance from the center of said disc pack, and said disc pack is attached to said bearing housing at said first mounting holes and said disc pack is attached to said support ring at said second mounting holes.

8. An assembly according to claim 7, wherein the first radial distance is equal to the second radial distance.

9. An assembly according to claim 7, wherein the first radial distance is less than the second radial distance.

10. An assembly according to claim 7, wherein said bearing housing, said support ring and said disc pack are each comprised of detachably connectable halves, adapted to be removed from the shaft without disturbing the shaft.

11. An assembly according to claim 1, wherein the steady bearing includes first and second bearings and the bearing housing comprises a first bearing housing surrounding the first bearing and a second bearing housing surrounding the second bearing; and
    wherein said flexible disc pack comprises a first flexible disc pack connecting the first housing to the support ring and a second flexible disc pack connecting the second housing to the support ring.

12. An assembly according to claim 11, wherein said first and second disc packs each comprise a plurality of disc elements.

13. An assembly according to claim 12, wherein said disc elements have a thickness of 0.010" to 0.060".

14. An assembly according to claim 12, wherein said housings, said support ring and said first and second disc packs are each comprised of detachably connectable halves, adapted to be removed from the shaft without disturbing the shaft.

15. A method of supporting a steady bearing housing having a bearing in rotational contact with the surface of a shaft in a vessel, comprising the steps of:
    supporting a support ring from the vessel; and
    flexing a disc pack that connects the steady bearing housing to the support ring to permit angular relative movement between a longitudinal axis of said housing and a longitudinal axis of said support ring.

16. A method according to claim 15, wherein said housing, said support ring and said disc pack are each comprised of detachably connectable halves, adapted to be removed from the shaft without disturbing the shaft.

17. A flexible support assembly for supporting a steady bearing in rotational contact with the surface of a shaft in a vessel, comprising:
    first supporting means for supporting the steady bearing, wherein said first supporting means comprises a bearing housing;

second supporting means suspended from the vessel, wherein said second supporting means comprises a support ring; and a flexible connecting means for flexibly connecting said first supporting means to said second supporting means.

18. An assembly according to claim 17, wherein said flexible connecting means comprises a disc pack.

19. An assembly according to claim 18, wherein said disc pack comprises a plurality of disc elements.

20. A flexible support assembly for supporting a steady bearing in rotational contact with surface of a shaft in a vessel, comprising:

a bearing housing supporting the steady bearing;

a support ring suspended from the vessel; and at least one flexible disc pack that solely connects said housing to said support ring.

21. A flexible support assembly for supporting a steady bearing in rotational contact with the surface of a shaft in a vessel, comprising:

a bearing housing supporting the steady bearing;

a support ring suspended from the vessel; and a flexible disc pack connecting said housing to said support ring, wherein said flexible disc pack includes a plurality of mounting holes.

* * * * *